United States Patent
Nishino et al.

(10) Patent No.: US 7,300,356 B2
(45) Date of Patent: Nov. 27, 2007

(54) APPARATUS AND METHOD OF MEASURING THE FLYING BEHAVIOR OF A FLYING BODY

(75) Inventors: Koichi Nishino, Kanagawa (JP); Hiroshi Saegusa, Kanagawa (JP)

(73) Assignees: National University Corporation Yokohama National University, Kanagawa (JP); The Yokohama Rubber Co., Ltd., Tokyo (JP)

( * ) Notice: Subject to any disclaimer, the term of this patent is extended or adjusted under 35 U.S.C. 154(b) by 242 days.

(21) Appl. No.: 11/094,200

(22) Filed: Mar. 31, 2005

(65) Prior Publication Data
US 2005/0233816 A1    Oct. 20, 2005

(30) Foreign Application Priority Data
Mar. 31, 2004  (JP)  ............... 2004-105165

(51) Int. Cl.
A63B 57/00    (2006.01)
(52) U.S. Cl. ....................... 473/131
(58) Field of Classification Search ........... 473/140, 473/409, 198–199, 151–156, 131
See application file for complete search history.

(56) References Cited

U.S. PATENT DOCUMENTS
6,458,035 B1    10/2002    Katayama

FOREIGN PATENT DOCUMENTS
JP    2000-19186    1/2000
JP    2003-057258    * 2/2003

* cited by examiner

Primary Examiner—Kim Nguyen
(74) Attorney, Agent, or Firm—Finnegan, Henderson, Farabow, Garrett & Dunner, L.L.P.

(57) ABSTRACT

A measuring apparatus has: a recording portion that optically records a flying body at intervals, to obtain a first image and a second image; an image information computing portion that detects a first outline region of the flying body from the first image and a second outline region of the flying body from the second image, and finds first image information from the first image and second image information from the second image: and a rotation amount computing portion that maps the first image information to a surface of a first visual spherical body, the second image information to a surface of a second virtual spherical body, and computes a rotation amount that is used for rotation processing when the rotation processing is performed on the first virtual spherical body to obtain a highest correlation between the first image information and the second image information.

13 Claims, 10 Drawing Sheets

APPARATUS AND METHOD OF MEASURING THE FLYING BEHAVIOR OF A FLYING BODY

INCORPORATION BY REFERENCE

This application claims priority on Japanese patent application No. 2004-105165, the entire contents of which are hereby incorporated by reference.

BACKGROUND OF THE INVENTION

The present invention relates to an apparatus and a method of measuring a flying behavior of a flying body, the apparatus and method being capable of measuring the flying behavior of the spherical flying body such as a golf ball with ease and high precision.

Measurement of the flying behavior of flying bodies is currently performed. For example, the flying behavior of a golf ball immediately after impact is measured by using images, based on which image measurements are made for simulating the carry distance of the golf ball.

A variety of flying behaviors of a golf ball may be found by using image measurement, such as velocity and movement direction. The velocity and angles of movement of a golf ball can be found by recording images at points in time with a predetermined interval of time therebetween, extracting the outline of each golf ball image, finding the center-of-mass point of each outline, measuring the distance between each center-of-mass point, and measuring the angle of movement of the center-of-mass point. In this case the extraction of the outlines of the golf ball can be performed at high precision, and therefore the velocity and the launch angle can be measured at high precision.

Further, a variety of measuring apparatuses and methods or measurement that measure the flying behavior of a golf ball, including rotational motion (spin) of the golf ball, have been proposed (refer to JP 2003-57258 A and JP 2000-19186 A, for example).

JP 2003-57258 A discloses a moving body motion parameter measuring apparatus capable of making accurate measurements of the velocity, motion direction, rotational angular velocity, and rotation direction of a moving body by using only one camera. In particular, the moving body motion parameter measuring apparatus can accurately measure initial trajectory parameters of a golf ball such as the initial velocity and launch angle of a golf ball immediately after being struck, and rotational angular velocity and rotation direction of the golf ball.

Referring to FIG. 13, specific marks are applied to the golf ball in order for the moving body motion parameter measuring apparatus to measure the spin of the golf ball.

A first golf ball image 102 and a second golf ball image 104 are recorded in one planar image 100 as shown in FIG. 13. Marks 106, 108, and 110 are provided to the first golf ball image 102 and to the second golf ball image 104.

It should be noted that the first golf ball image 102 and the second golf ball image 104 are represented as extracted outlines at points in time with a predetermined interval of time therebetween.

In JP 2003-57258 A, the positions of the marks 106, 108, and 110 in the first golf ball image 102 are tracked to the marks 106, 108, and 110, respectively, in the second golf ball image 104, and the rotation amount of the golf ball is computed.

The spin rate of the golf ball can thus be found in JP 2003-57258 A by tracking and locating the positions of the marks 106, 108, and 110 after a predetermined period of time has elapsed.

Further, JP 2000-19186 A discloses a method of measuring the rotational motion of a golf ball. The rotational motion of a hit golf ball is measured with this method from a projected image by photographing the hit golf ball using two cameras disposed along the flight line direction of the hit golf ball with a space therebetween. A golf ball on which a convex polygon shaped mark are printed onto a surface of the golf ball in black or a similar dark color to black is used with this method of measuring the rotational motion of a golf ball. The position of the convex polygon shaped mark through automatic image processing performed by a computer on photographed images, without any human labor involved, and the rotational motion of the hit golf ball is computed based on changes in the angular positions between the photographed images taken by the two cameras.

Referring to FIG. 14, an isosceles triangle shaped mark 125 is provided on the golf ball in the method disclosed by JP 2000-19186 A.

In this case two golf ball images 122 and 124 are recorded onto one frame 120 as shown in FIG. 14. The golf ball images 122 and 124 are recorded at points in time with a predetermined interval of time therebetween and undergo outline extraction.

The positions of the angle portions 126, 128, and 130 of the mark 125 in the golf ball image 122 are tracked to the angle portions 126, 128, and 130, respectively, of the mark 125 in the golf ball image 124, and the rotation amount of the golf ball is computed.

The backspin rate and side spin rate on the golf ball can thus be found by locating the positions of the marks after a predetermined period of time has elapsed.

The inventions disclosed in JP 2003-57258 A and JP 2000-19186 A both find the amount of rotation of a golf ball by providing a mark or marks on the golf ball for measurement of the amount of rotation of a golf ball, and by tracking the marks on images of the golf ball photographed at points in time with a predetermined interval of time therebetween.

Accordingly, the amount of rotation of the golf ball can be found by tracking the marks in the case where the golf ball rotates about a rotation axis that is perpendicular to the photographed surface of the golf ball.

However, a portion of the mark will be hidden, and the entire mark will thus be unable to be photographed, if the golf ball rotates about a rotation axis that is parallel to the photographed surface of the golf ball. The marks being tracked may be hidden in part, and thus there is a fear that the precision in measuring the rotation amount of the golf ball will decrease. In addition, it becomes necessary to change the measurement conditions or the like in order to prevent the mark from thus being hidden. Then, another problem will exist in that changes to settings on the measurement apparatus are unavoidable because measurement conditions are changed. Measurement work thus becomes complex.

SUMMARY OF THE INVENTION

In order to solve problems based on the conventional techniques described above, an object of the present invention is to provide an apparatus and a method of measuring the flying behavior of a flying body, capable of measuring the flying behavior of a spherical flying body, such as a golf ball with ease and high precision.

The present invention provides a measuring apparatus that measures a flying behavior of a spherical flying body. The measuring apparatus comprises: a recording portion that optically records the flying body during flight at points in time with a predetermined interval of time, to obtain a first image and a second image of the spherical flying body; image information computing portion that detects a first outline region of the flying body in the first image of the flying body and a second outline region of the flying body from the second image of the flying body, and finds first image information from the first image of the flying body in at least a portion of the first outline region and second image information from the second image of the flying body in the second outline region; and rotation amount computing portion that maps the first image information to a surface of a first virtual spherical body, maps the second image information to a surface of a second virtual spherical body, and computes a rotation amount that is used for rotation processing such that the rotation processing is performed on the first virtual spherical body to obtain a highest correlation between the first image information on the surface of the first virtual spherical body and the second image information on the surface of the second virtual spherical body.

Preferably, the measuring apparatus further comprises rotational velocity computing portion for computing a rotational velocity of the flying body based on the predetermined interval of time and the rotation amount of the flying body.

The rotational velocity computing portion more preferably further decomposes the rotation amount of the flying body into components in three axial directions, and computes the rotational velocity in each of the axial directions.

Then, preferably, the flying body flies with an angle of inclination with respect to a horizontal plane; a first axis direction from among the three axial directions is defined as a first direction that is parallel to the horizontal plane; and a second axis direction from among the three axial directions is defined as a second direction that is perpendicular to the horizontal plane.

When the flying body is a golf ball, the rotation amount per unit time about the first axis direction may be defined as backspin rate; and the rotation amount per unit time about the second axis direction may be defined as side spin rate.

The first image information and the second image information are preferably expressed by a pattern having at least two gray scale levels; and the first image information and the second information preferably have the same number of gray scales.

The invention also provides a method of measuring a flying behavior of a flying body. The method comprises: optically recording a spherical flying body during flight at points in time with a predetermined interval of time, to obtain a first image and a second image; detecting a first outline region of the flying body in the first image of the flying body; finding first image information from the first image of the flying body in at least a portion of the first outline region; detecting a second outline region of the flying body in the second image of the flying body; finding second image information from the second image of the flying body in the second outline region; mapping the first image information to a surface of a first three-dimensional virtual spherical body; mapping the second image information to a surface of a second three-dimensional spherical body; performing rotation processing on the first virtual spherical body; and computing a rotation amount that is used for the rotation processing such that a highest correlation is obtained between the first image information on the surface of the first virtual spherical body and the second image information on the surface of the second virtual spherical body.

Preferably, the method further comprises computing a rotational velocity of the flying body based on predetermined interval of time and the rotation amount.

The computing of the rotation amount of the flying body preferably includes decomposing the rotation amount of the flying body into components in three axial directions and computing the rotational velocity in each of the axial directions.

When the flying body is a golf ball and the golf ball flies with an angle of inclination with respect to a horizontal plane, the rotation amount per unit time about a first axis direction parallel to the horizontal plane from among the three axial directions may be defined as backspin rate and the rotation amount per unit time about a second axis direction perpendicular to the horizontal plane from among the three axial directions may be defined as side spin rate.

The first image information and the second image information may be preferably expressed by a pattern having at least two gray scale levels; and the first image information and the second information may have the same number of gray scales.

The measuring apparatus according to the present invention includes: a recording portion that records a spherical flying body in a first image of the flying body and a second image of the flying body recorded at different points in time; image information computing portion that detects a first outline region of the flying body in the first image of the flying body, finds first image information from the first image of the flying body in at least a portion of the first outline region, detects a second outline region of the flying body in the second image of the flying body, and finds second image information from the second image of the flying body in the second outline region; and rotation amount computing portion that maps the first image information to a surface of a first virtual spherical body, maps the second image information to a surface of a second virtual spherical body, and computes a rotation amount that is used for rotation processing when the rotation processing is performed on the first virtual spherical body to obtain a highest correlation between the first image information on the surface of the first virtual spherical body and the second image information of the second virtual spherical body. The rotation amount of the flying body can thus be computed by using the first image information and the second image information, without providing a specialized mark or the like on a surface of the flying body. Accordingly, the flying behavior of the flying body can be measured with ease and high precision, without any decreases in the measurement precision due to undetectability of a portion of the mark.

The method of measuring a flying behavior of a flying body according to the present invention includes: optically recording a spherical flying body during flight at points in time with a predetermined interval of time therebetween; detecting a first outline region of the flying body in a first image of the flying body; finding first image information from the first image of the flying body in at least a portion of the first outline region; detecting a second outline region of the flying body in the second image of the flying body; finding second image information from the second image of the flying body in the second outline region; mapping the first image information to a surface of a first three-dimensional virtual spherical body; mapping the second image information to a surface of a second three-dimensional spherical body; performing rotation processing on the first virtual spherical body; and computing a rotation amount that is used for the rotation processing when a highest correlation is obtained between the first image information on the surface of the first virtual spherical body and the second image information on the surface of the second virtual spherical body. The rotation amount of the flying body can thus be computed from the recorded image of the spherical flying body by using the first image information and the second image information, without providing a specialized mark or the like on a surface of the flying body. Accordingly, the flying behavior of the flying body can be measured with ease and high precision, without any decreases in the measurement precision due to undetectability of a portion of the mark.

DETAILED DESCRIPTION OF THE PREFERRED EMBODIMENTS

A measuring apparatus and a method of measuring the flying behavior of a flying body are explained below based on preferred embodiments shown in the appended drawings.

An initial trajectory measuring apparatus that measures the initial velocity of a golf ball immediately after impact, the launch angle of the golf ball immediately after impact, and the side spin and the backspin of the golf ball immediately after impact is explained below as an example of a measuring apparatus of the present invention.

Figure 1:
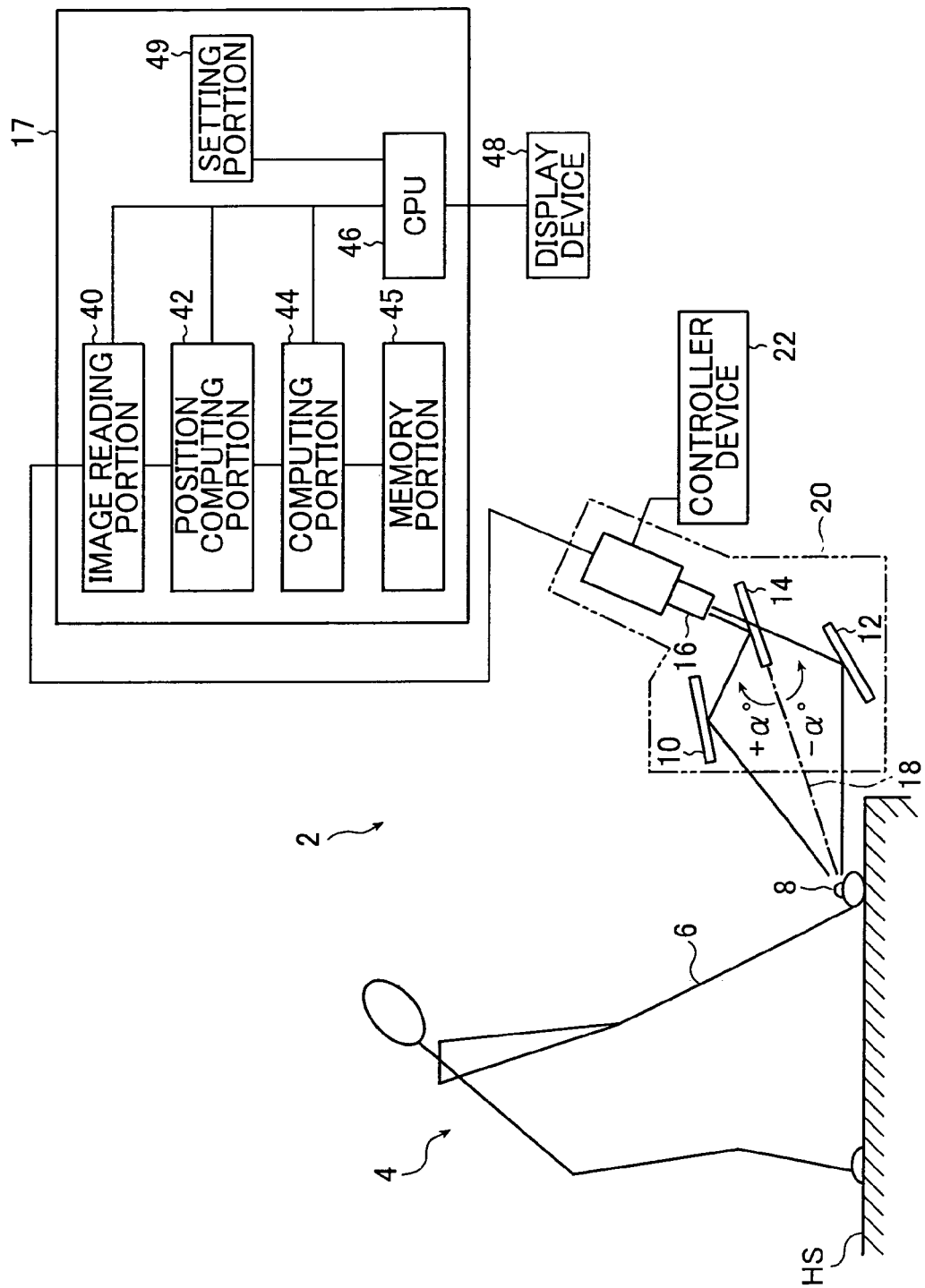
FIG. 1 is a schematic side view that shows an initial trajectory measuring apparatus, which is an example of a measuring apparatus according to a first embodiment of the present invention.
Figure 2:
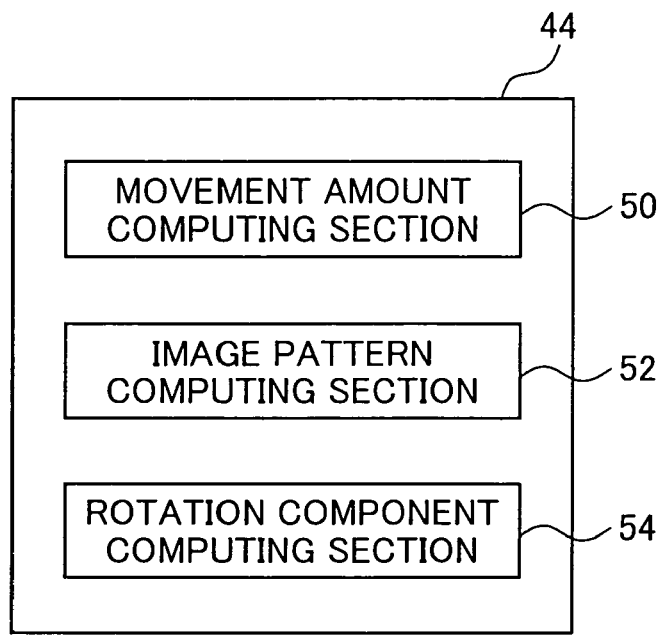
FIG. 2 is a block diagram that shows the configuration of a calculating portion in the first embodiment.

FIG. 1 is a schematic side view that shows an initial trajectory measuring apparatus, which is an example of a measuring apparatus according to a first embodiment of the present invention, and FIG. 2 is a block diagram that shows the configuration of a calculating portion in the first embodiment.

Referring to FIG. 1, an initial trajectory measuring apparatus 2 of a golf ball 8 measures initial trajectory characteristic values of the golf ball 8 immediately after impact when a golfer 4 impacts the golf ball 8 by using a golf club 6. The golf ball 8 is struck and flies having a predetermined angle of inclination with respect to a horizontal plane HS in this embodiment.

The initial trajectory characteristic values may include initial velocity, launch angle, side spin rate, backspin rate.

The horizontal plane HS is defined here as a plane used as a reference for the initial trajectory measuring apparatus 2. The horizontal plane HS is preferably required to be inclined within a range of ±2° with respect to horizontal, and is most preferably set to horizontal by using a level or the like.

The initial trajectory measuring apparatus 2 has two mirrors 10 and 12 that reflect an image of the golf ball 8 struck from a tee on which the golf ball 8 is mounted, the mirrors being on a side opposite the golfer 4, sandwiching the golf ball 8, which is a body to be photographed, and a half mirror 14. The two images of the golf ball immediately after impact, which are reflected by the two mirrors 10 and 12, are projected onto two different surfaces of the half mirror 14. The image projected from the mirror 10 is reflected by the half mirror 14, while the image projected from the mirror 12 is transmitted through the half mirror 14. The initial trajectory measuring apparatus 2 also has a high resolution CCD camera (recording portion) 16 which photographs the golf ball image that has passed through the half mirror 14 together with the image of the golf ball that has been reflected by the half mirror 14. The initial trajectory measuring apparatus 2 also has an initial trajectory characteristic computing portion 17 that computes initial trajectory characteristic values for the golf ball 8 based on the golf ball images photographed (recorded) by the CCD camera 16.

The mirrors 10 and 12 are disposed in the periphery of a trajectory path assumed immediately after the golf ball 8 is struck. The mirrors 10 and 12 are separated by substantially the same distance from the golf ball 8 immediately after being struck, and reflect images of the golf ball as seen from two different directions.

The half mirror 14 is an optical member having a boundary surface that at least transmits an image projected from one side thereof and at least reflects an image that is projected from another side thereof. The half mirror 14 is disposed on a plane of symmetry 18 in a position substantially symmetrical between the locations of the mirrors 10 and 12, so that the boundary surface of the half mirror 14 is located parallel with the plane of symmetry 18. In other words, the inclination angles of the reflective surfaces of the mirrors 10 and 12 with respect to the surface of the half mirror 14 or the plane of symmetry 18 are set to have opposite signs while having equal absolute values (angles +α° and −α° in FIG. 1).

Further, although the initial trajectory measuring apparatus 2 for the golf ball 8 photographs images of the golf ball 8 from two different directions immediately after the golf ball 8 is struck, by making minute adjustments in the positions of the mirrors 10 and 12, the angles at which the two images of the golf ball are projected on the half mirror 14 can be made to substantially coincide. In addition, by making another minute adjustments in the positions of the mirrors 10 and 12 so that the golf ball images are as close to each other as possible without overlapping, a golf ball image is formed. The close together golf ball images can then be photographed as one image by the CCD camera. A controller device 22 is provided connected to the CCD camera 16. The controller device 22 performs control to automatically open and close an electronic shutter so that the CCD camera 16 can perform photography at a predetermined timing. The field of view of a region photographed by the CCD camera 16 can thus be made narrower, and the images of the golf ball 8 can be photographed with high precision, by arranging the golf ball images seen from two different directions close each other using the half mirror 14. Further, the two images of the golf ball are unlikely overlapping, thus making it possible to perform later image processing and make later measurements of the initial trajectory characteristic values.

Any optical camera can also be used instead of the CCD camera 16. However, it is preferable to use the CCD camera 16, which outputs digitized images, in order to easily detect the position of the golf ball 8 when measuring initial trajectory characteristic values such as the initial velocity and the launch angle of the golf ball 8, rotational angular velocities such as backspin rate and side spin rate, and rotation direction, as described hereinafter. This is because image processing of the photographed image of the golf ball 8 can be performed, and the image of the golf ball 8 can be quickly detected. Further, the initial trajectory measuring apparatus 2 for the golf ball 8 of this embodiment can be made portable by being received in a case 20 in which the components are arranged and fixed and which has a surface covered with a transparent member through which the two images of the object to be photographed that are projected by the two mirrors 10 and 12, and can be easily moved and installed in a desired location. In addition, a strobe apparatus that illuminates the golf ball 8 during photography thereof, or depending upon the circumstances, an apparatus that emits natural light or artificial light, sufficiently bright for the golf ball 8, or the like may of course also be used.

When measuring the initial trajectory characteristic values of the golf ball 8 with the initial trajectory measuring apparatus 2 for the golf ball 8 thus configured, images of the golf ball 8 struck and flying immediately after impact are photographed as one planar image by strobe light emitted two times at points in time with a predetermined interval of time therebetween. As becomes clear when referring to FIG. 1, the images of the golf ball 8 that are reflected by the mirror 10, and then re-reflected by the half mirror 14 and projected to the CCD camera 16 (hereinafter called upper side images) are set to appear in an upper side of the image photographed by the CCD camera 16. Images of the golf ball 8 that are reflected by the mirror 12, and then transmitted through the half mirror 14 and projected to the CCD camera 16 (hereinafter called lower side images) are set to appear in a lower side of the image photographed by the CCD camera 16.

Figure 3:
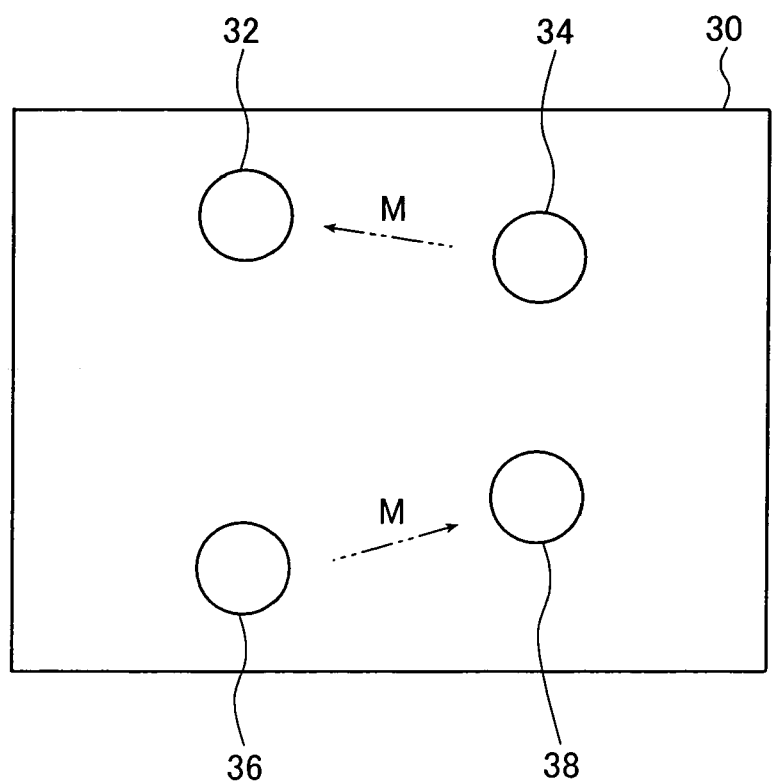
FIG. 3 is a schematic view that shows an example of an image obtained by the initial trajectory measuring apparatus of the first embodiment.

Referring to FIG. 3, four round shape golf ball images 32, 34, 36, and 38 are recorded within one planar image 30.

It should be noted that, in this embodiment, the upper side images are mirror images, and the lower side images are normal images. The mirror images are recorded with opposite flying directions M. Further, the golf ball images 34 and 36 correspond to first flying images of the present invention, while the golf ball images 32 and 38 correspond to second flying images of the present invention.

The golf ball images 32 and 34 are upper side images (mirror images) in this embodiment, and the golf ball images 36 and 38 are lower side images (normal images), as described above.

FIG. 3 is a schematic view that shows an example of an image obtained by the initial trajectory measuring apparatus of this embodiment.

Further, the strobe light is emitted two times at points in time with a predetermined interval of time therebetween. Accordingly, the golf ball images 34 and 36 are photographed using the first strobe illumination light, while the golf ball images 32 and 38 are photographed using the second strobe illumination light. The two strobe illumination lights are emitted after a shutter of the CCD camera 16 is opened following a predetermined time delay from a point where a trigger signal is generated by the swinging golf club 6 passing immediately prior to impacting the golf ball 8. Images of the golf ball are photographed when the two strobe illumination lights are emitted.

The golf ball images 32 and 34 as the upper side images and the golf ball images 36 and 38 as the lower side images are photographed and are combined into four images on the planar image 30. The golf ball images 34 and 36 are photographed first, while the golf ball images 32 and 38 are photographed after the predetermined interval of time has elapsed.

It should be noted that there are no limitations placed on using an image in which the four golf ball images 32, 34, 36, and 38 appear, photographed by the CCD camera 16 using the strobe illumination light emitted at points in time with a predetermined interval of time therebetween. An image may also be used in which the golf ball images 32, 34, 36, and 38 are photographed by opening the shutter of the CCD camera 16 two times, with the predetermined interval of time therebetween, resulting in multiple exposures may also be used. In addition, the shutter may also be opened only for the predetermined interval of time, and a residual image of the golf ball 8 in the direction of travel may be obtained. Images of the golf ball 8 at both ends of the residual image may be used as the four golf ball images 32, 34, 36, and 38. Further, images may also be extracted from images photographed by a high speed video camera with the same predetermined interval of time therebetween, and images at both ends of the extracted images may be used as the four golf ball images 32, 34, 36, and 38.

The planar image 30 photographed by the CCD camera 16 is output to the initial trajectory characteristic value computing portion 17.

The projection angle of the two images of the golf ball that are projected onto the half mirror 14 are thus made to substantially coincide, and moreover, the images of the golf ball 8 are arranged close each other. In addition, the angles of incline of the reflecting surfaces of the mirrors 10 and 12 with respect to the half mirror 14 have mutually opposite signs and substantially equal absolute values. Accordingly, the path lengths of the golf ball images from the golf ball 8 being photographed, which are reflected by the mirror 10 or the mirror 12 and arrive at the CCD camera 16, become substantially equal. One of the golf ball images does not become out of focus unlike conventional apparatuses.

The initial trajectory characteristic computing portion 17 computes initial trajectory characteristic values such as the velocity, the launch angle, the backspin rate, and the side spin rate of the golf ball 8 based on the images of the golf ball 8 photographed by the CCD camera 16. The initial trajectory characteristic computing portion 17 has an image reading portion 40, a position computing portion 42, a computing portion 44, a memory portion 45, a CPU 46, and a setting portion 49.

The image reading portion 40 reads the planar image 30 photographed by the CCD camera 16 as digital data, and performs image processing to delete unnecessary images, such as the environment in the periphery of the golf ball 8. The image reading portion 40 detects circular outline regions (not shown) of the golf ball 8. Regions enclosed by the outlines are included in the circular outline regions.

The image reading portion 40 detects outlines of the four golf ball images 32, 34, 36, and 38 as shown in FIG. 3.

The position computing portion 42 extracts center-of-mass positions for the golf ball images 32, 34, 36, and 38, and in addition, computes a vertical plane component and the horizontal plane HS component of the positions in the position coordinates system.

It should be noted that it is preferable that the position computing portion 42 have a function of computing the diameters of the golf ball images 32, 34, 36, and 38.

Referring to FIG. 1, the two mirrors 10 and 12 are inclined at predetermined angles. Accordingly, the coordinates of the center-of-mass positions of the golf ball images 32, 34, 36, and 38 in the image obtained as the planar image 30 projected by the mirrors 10 and 12 are composed of an additional vertical plane component and an additional horizontal plane HS (refer to FIG. 1) component corresponding to the inclination angles of the mirrors 10 and 12. The coordinate values of the positions of the center-of-mass for the golf ball images 32, 34, 36, and 38 are thus computed and decomposed corresponding the inclination of the mirrors 10 and 12 so that the actual vertical plane and the actual horizontal plane HS components result. The coordinates of the center-of-mass position of the golf ball 8 in the vertical plane and the horizontal plane HS components at the point when the first strobe illumination light is emitted (hereinafter called a first time point) are then computed. The coordinates of the center-of-mass position of the golf ball 8 at the point when the second strobe illumination light is emitted (hereinafter called a second time point) are also computed. The computed coordinates are then output to the computing portion 44.

It should be noted that in the position computing portion, the diameters of the golf ball images 32, 34, 36, and 38 may also be computed at the point when the first strobe illumination light is emitted, and at the point when the second strobe illumination light is emitted when computing the coordinates of the center-of-mass position of the golf ball 8. The diameters of the golf ball images 32, 34, 36, and 38 at the first time point and the second time point thus computed may then be output to the computing portion 44. The path along which the golf ball 8 moves can thus also be computed three-dimensionally as described later by computing the diameter of the golf ball.

The computing portion 44 computes the initial velocity, the launch angle, the backspin rate, and the side spin rate of the golf ball 8. Referring to FIG. 2, the computing portion 44 has movement amount computing section 50, image pattern computing section 52, and rotation component computing section (rotational velocity computing portion) 54. The position computing portion 42 and the image pattern computing section 52 configure image information computing portion of the present invention.

The movement amount computing section 50 computes the movement distance and the movement direction of the three-dimensional center-of-mass of the golf ball 8 from the center-of-mass position coordinates of each of the images 32, 34, 36, and 38 of the golf ball 8. The movement amount computing section 50 also computes the initial velocity or the movement velocity, and the launch angle, of the golf ball 8.

The launch angle in this embodiment expresses the movement direction defined by the first time point image (the golf ball image 34) and the second time point image (the golf ball image 32) on a plane that is orthogonal to the horizontal plane HS and contains the initial direction at which the golf ball 8 is struck. The launch angle is an angle formed between a line projected onto the plane and a line indicating the horizontal plane HS. The movement direction expresses the direction at which the center-of-mass of the golf ball 8 travels when the flying body is a golf ball.

Further, the initial direction at which the golf ball 8 is struck shows a target direction (flying direction) of the golf ball 8 (flying body) used as a reference for the initial trajectory measuring apparatus 2, and is set as appropriate It should be noted that the movement amount computing section 50 outputs the computed launch angle, and the initial velocity or the movement velocity to the memory portion 45.

The golf ball 8 is photographed from two directions by the initial trajectory measuring apparatus of this embodiment. Consequently, a stereo imaging method for photographing from two directions can be used in computing the flying trajectory of the golf ball 8 in three-dimensional space.

It should be noted that the flying trajectory of the golf ball 8 in three-dimensional space can be computed by calibration of a stereo projection method as described hereinafter. A calibration method is explained in detail later.

The image pattern computing section 52 computes first image information of the entire region, or of a predetermined region, of the golf ball outline region initially recorded. The image pattern computing section 52 converts image data of the golf ball image initially recorded, which has not undergone image processing, into density data having a predetermined number of gray scales, and extracts a specific density pattern expressed by the density data obtained as the first image information. For example, when the first image information is found for a predetermined region, the density pattern of the density data of pixels in the predetermined region is taken as the first image information. Further, when finding the first image information for the entire region of the golf ball outline region, a portion having a large gray scale difference, such as a stain, may be set to a specific density pattern.

Furthermore, the density pattern may also be set so that the density data expressed in a display device 48 can be seen by a human. The computed density pattern may thus be set in a setting portion 49 described hereinafter.

In addition, the image pattern computing section 52 computes density data for the golf ball outline region photographed after the predetermined interval of time has elapsed. The computation is made under the same conditions as those used for the golf ball outline region initially recorded over the entire outline region. The image pattern computing section 52 then computes a density pattern (second image information).

It should be noted that, in this embodiment, the density patterns found as the first image information and the second image information are used as image characteristic quantities, and thus have the same number of gray scales.

A method of computing a rotation axis and a rotation amount of a golf ball of this embodiment are explained below using the upper side image shown in FIG. 3, that is the golf ball image 34 (the first time point image) and the golf ball image 32 (the second time point image), as an example.

Figure 4:
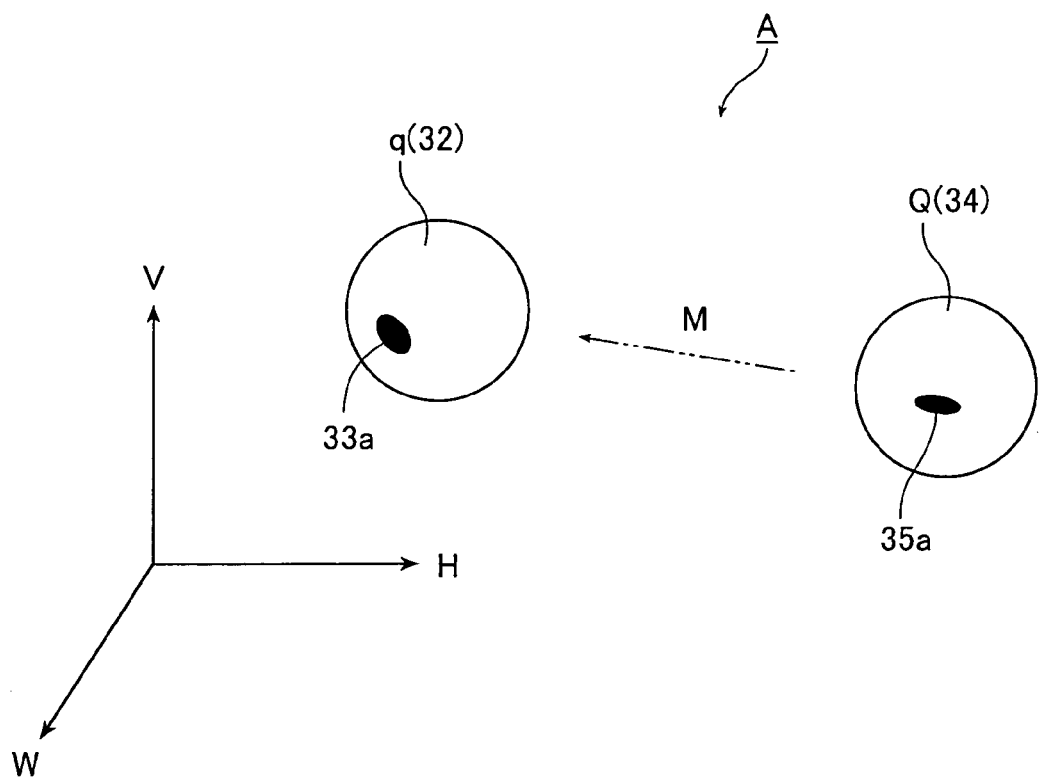
FIG. 4 is a schematic perspective view that explains a method of computing a rotation axis and a spin rate of a golf ball in the first embodiment.

FIG. 4 is a schematic perspective view that explains a method of computing a rotation axis and a rotation amount of a golf ball in this embodiment. It should be noted that symbols V, H, and W in FIG. 4 denote mutually orthogonal axes. Symbol V in FIG. 4 denotes a vertical axis, symbol W denotes a first horizontal axis that is orthogonal to the vertical axis V, and symbol H denotes a second horizontal axis that is orthogonal to the vertical axis V and to the first horizontal axis W. The first horizontal axis W and the second horizontal axis H are contained in the horizontal plane HS. An arrow M in FIG. 4 denotes a flying direction similarly to FIG. 3.

It should be noted that the horizontal direction of the first horizontal axis W shown in FIG. 4 corresponds to a first axis direction of the present invention. Further, the vertical direction of the vertical axis V shown in FIG. 4 corresponds to a second axis direction of the present invention.

The three mutually orthogonal axes are used in computing the rotation axis and the rotation amount of a golf ball (flying body) in this embodiment. The present invention is not limited, however, to using the three mutually orthogonal axes. For example, an axis parallel to a striking direction may be used instead of the second horizontal axis H shown in FIG. 4.

Referring to FIG. 4, the golf ball image 34, for example a density pattern 35a obtained by binarization processing by the image pattern computing section 52, is mapped onto a surface of a first three-dimensional virtual sphere Q (hereinafter called first virtual sphere Q) provided in a virtual space A. Further, the golf ball image 32, for example a density pattern 33a obtained by binarization processing, is mapped onto a surface of a second three-dimensional virtual sphere q (hereinafter called second virtual sphere q). The first virtual sphere Q and the second virtual sphere q have the same diameter in this embodiment. The movement amount detecting section 50 finds a rotation axis, and a rotation amount (rotation angle) about the rotation axis, in three-dimensional space by employing an image correlation method using the first virtual sphere Q and the second virtual sphere q.

In this case the first virtual sphere Q is rotated three-dimensionally. The three-dimensional rotation amount where a correlation coefficient between the density pattern 35a and the density pattern 33a in the second virtual sphere q becomes greatest is set as the three-dimensional rotation amount of the golf ball 8 between the two time points (the rotation axis and the amount of rotation (rotation angle) about the rotation axis, in three-dimensional space).

The three-dimensional rotation amount obtained by the image correlation method is divided into each axial direction shown in FIG. 4 (the vertical axis V direction, the first horizontal axis W direction, and the second horizontal axis H direction). The amount of backspin and the amount of side spin can thus be found as described hereinafter.

Further, the three-dimensional rotation amount (rotation axis and rotation angle) of the golf ball images 36 and 38 are found similarly to those of the golf ball images 32 and 34.

As described above, the density pattern 35a for the golf ball shown in FIG. 4 specifies where the golf ball is after a predetermined amount of time has elapsed, and the movement amount computing section 50 functions as rotation amount computing portion of the present invention.

The movement amount computing section 50 performs rotation processing on the first virtual sphere Q in this embodiment, as described above. When making a comparison between the density pattern 35a on the surface of the first virtual sphere Q and the density pattern 33a on the surface of the second virtual sphere q at this point, a rotation amount used in rotation processing for a state where a correlation coefficient becomes highest is computed. In addition, based on this computation, the rotation axis, and the rotation amount (rotation angle) about the rotation axis, of the first virtual sphere Q in three-dimensional space are found.

The golf ball is presupposed to be a sphere in this embodiment, and the predetermined region is presupposed to be formed on the sphere. Accordingly, no particular limitations are placed on the number of the rotation axes, and the direction or the rotation axes, around which the first virtual sphere Q rotates when making a comparison (matching images) between the first virtual sphere Q, on which rotation processing has been performed, and the second virtual sphere q. The vertical axis V, the first horizontal axis W, and the second horizontal axis H shown in FIG. 4 can be given as one example.

Figure 5:
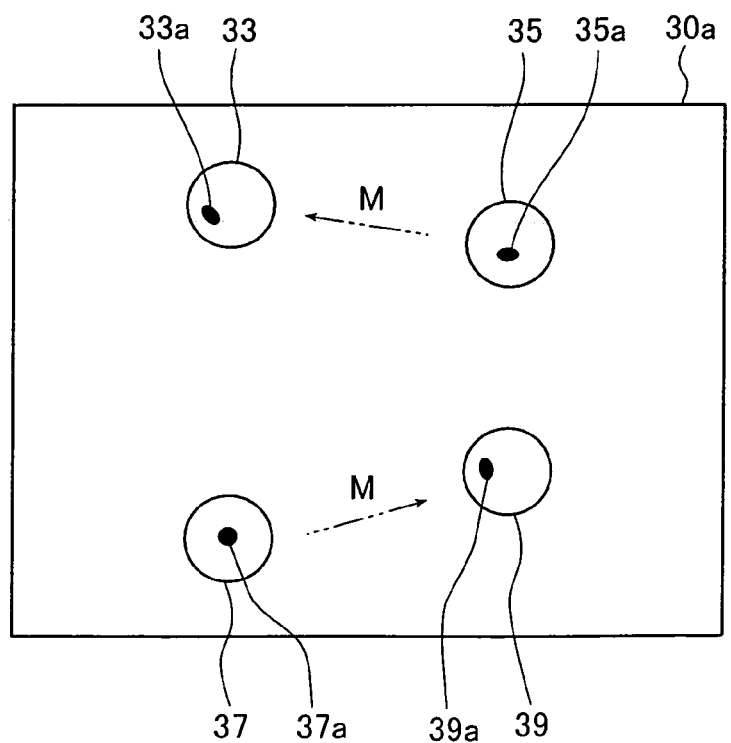
FIG. 5 is a schematic view that shows outline images of the first embodiment.

Furthermore, the image pattern computing section 52 creates the planar image 30a having outline images 33, 35, 37, and 39 as shown in FIG. 5, based on the density pattern data computed from the golf ball images 32, 34, 36, and 38. The planar image 30a is displayed on the display device 48.

The outline images 33, 35, 37, and 39 of the golf ball 8 shown in FIG. 5 are obtained by projecting the first virtual sphere Q and the second virtual sphere q shown in FIG. 4, and are displayed in the display device 48 to allow a user to view the images. The outline images 33, 35, 37, and 39 shown in FIG. 5 are obtained by projecting the virtual spheres, on which density patterns 33a, 35a, 37a, and 39a are mapped to surfaces thereof.

Furthermore, in this embodiment, the first image information in the golf ball image recorded initially can be used as a specific point in order to compute the rotation amount. Accordingly, it is not necessary to perform the computation over the entire outline region of the golf ball image. The first image information may be computed for at least a portion of the outline region. It is preferable that there be a plurality of regions in the outline region used to compute the first image information in order to increase the measurement precision.

Furthermore, by ignoring the movement amount of the center-of-mass of the golf ball between the two time points when finding the three-dimensional rotation amount in this embodiment, the three-dimensional rotational motion of the golf ball 8 may be exchanged with the rotation amount artificially centered about the center-of-mass.

The rotation component computing section 54 computes the rotational velocity (spin rate) of a golf ball based the interval of time between recordings, the coordinates of the center-of-mass, and the rotation axis and the rotation amount (rotation angle) of the golf ball in three-dimensional space described above computed by the movement amount computing portion 50. The computational results for the rotational velocity are output to the memory portion 45.

Further, the rotation component computing section 54 can also find the rotation amount about each axis per unit time, for example, by decomposing the rotation into the three axes shown in FIG. 4, the vertical axis V, the first horizontal axis W, and the second horizontal axis H. In this case the rotation amount per unit time about the first horizontal axis W is the backspin rate. Further the rotation amount about the vertical axis V is the side spin rate.

The backspin rate and the side spin rate results computed by the rotation component computing section 54 are output to the memory portion 45.

The setting portion 49 stores density patterns computed by the image pattern computing section 52, such as the density pattern 35a shown in FIG. 4, or a density pattern (first image information) set by a human, for example, on an initial trajectories measurement.

Further, the setting portion 49 sets the size of a region in which a logo is provided when using the logo or the like provided on a surface of the golf ball on the measurement.

It should be noted that the setting portion 49 stores the size of the flying body to be measured, and the positions of the photographed sample points in the photographed image in each of the coordinate dimensions of the three-dimensional space obtained by calibration, which is described hereinafter. In this embodiment the setting portion 49 may also store the size of the golf ball to be measured.

Further, the memory portion 45 is connected to the computing portion 44. The memory portion 45 stores initial trajectory characteristic values (initial velocity, launch angle, backspin rate and side spin rate) immediately after impact. It should be noted that the memory portion 45 has memory elements such as DRAM.

In the initial trajectory measuring apparatus of the present invention, density patterns are extracted from predetermined regions of the golf ball image initially recorded, without providing special marks to the golf ball. The density pattern for the entire region of the golf ball image recorded next is obtained under the same conditions as those used for the golf ball image initially recorded. The density patterns at the two time points are mapped onto the surface of the first virtual sphere and the surface of the second virtual sphere, respectively. By using an image correlation method, for example, the position of the density pattern of the golf ball image initially recorded can be specified in the second virtual sphere at the next point in time. The three-dimensional rotation amount (backspin amount and side spin amount) of the golf ball can thus be found in a manner similar to providing a mark and then detecting the position of the mark.

Moreover, an image correlation method is used in this embodiment, and therefore the amount of backspin and the amount of side spin can even be found even in the case where a portion of the density pattern is not recorded in the golf ball outline region at the next time point. The measurement precision is thus high compared to conventional mark tracking. High universality can thus be provided for the measured data.

Further, a mark is generally provided in order to determine whether or not a golf ball is an authorized ball, and in addition, dimples are also formed on the ball. A parting line may also develop during golf ball production, and further, a stain or the like may adhere to the golf ball. These marks, dimples, parting lines, stains, and the like may be converted to density data having a predetermined number of gray scales, thus obtaining a specific density pattern. The density pattern can then be used for the first image information and the second image information. The golf ball can thus be used as is, and the initial trajectories thereof can be easily measured.

An example of a method of measuring the flying behavior of a flying body of the present invention is explained next in detail. An initial trajectory computing method for a golf ball is taken as an example.

A calibration method for the initial trajectory measuring apparatus 10 of this embodiment is explained first.

Figure 6A:
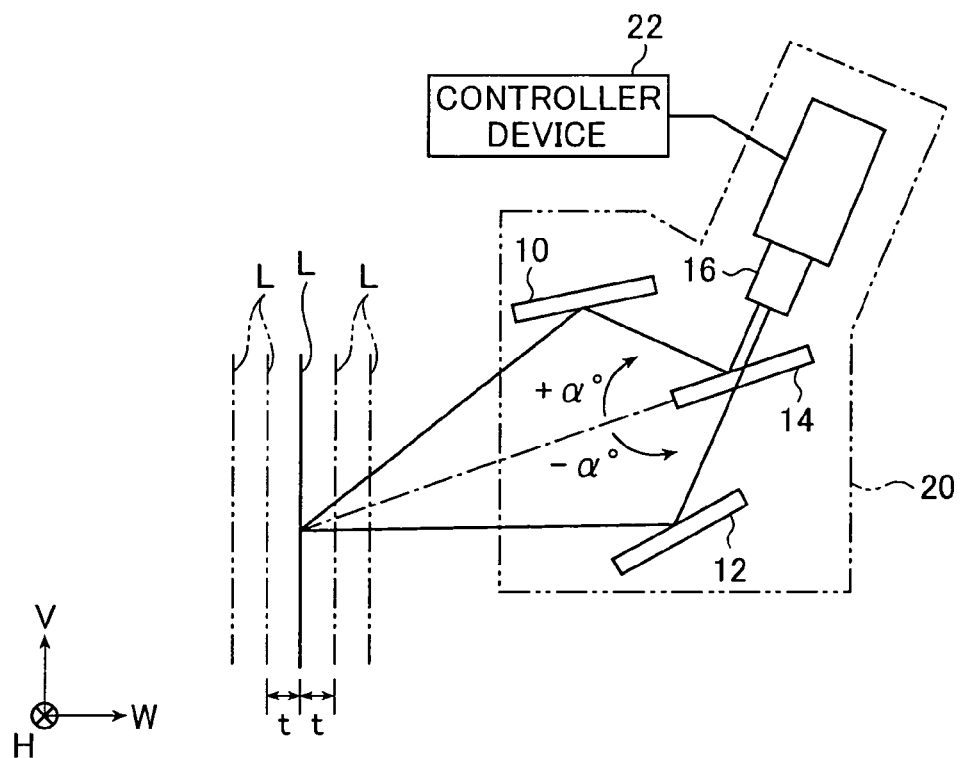
FIG. 6A is a schematic view that explains a method of calibrating an initial trajectory measuring apparatus according to an embodiment of the present invention.
Figure 6B:
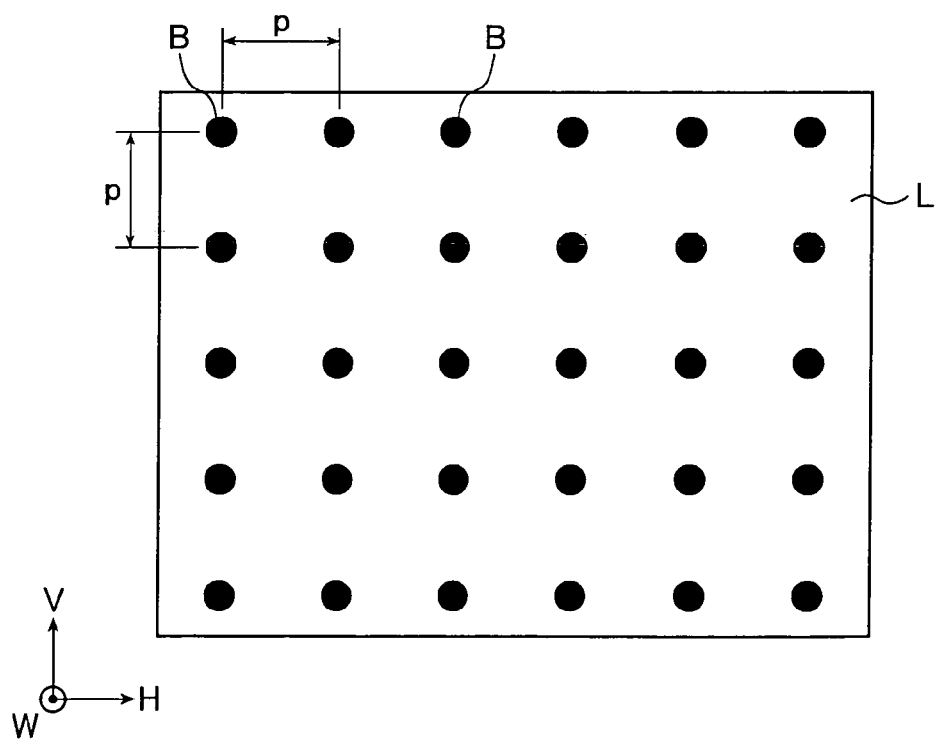
FIG. 6B is a schematic view that shows a calibration plate used in calibration, on which a plurality of measurement points are recorded.

FIG. 6A is a schematic view that explains a method of calibrating an initial trajectory measuring apparatus according to an embodiment of the present invention, and FIG. 6B is a schematic view that shows a calibration plate used in calibration, on which a plurality of sample points are recorded. It should be noted that symbol L denotes a calibration plate. The golf ball 8 is placed at the position of the calibration plate L shown by a solid line in FIG. 6A. Further, coordinate axes shown in FIGS. 6A and 6B correspond to those of FIG. 4.

In the calibration method of this embodiment, first the golf ball is placed in the set position as shown in FIG. 6A, and the calibration plate L is photographed. Circles B (sample points) having a predetermined size are formed at identical pitches p in two orthogonal directions on the calibration plate L.

Next, the calibration plate L is moved in a direction parallel to the first horizontal axis W by a distance t that equals the pitch p. The calibration plate L is then photographed. By thus moving the calibration plate L and taking photographs, the circles B having a predetermined size are thus photographed on a spatial lattice having equal spacing with respect to three orthogonal directions. The positions of the photographed images at each of the circles B on the spatial lattice are stored in the setting portion 49.

Accordingly, a relationship becomes apparent between the position of each point on the spatial lattice and the position of images photographed at each circle, photographed from two directions. In other words, the position of the camera (distance from the object to be photographed), the photographing angle can be computed from the positions of each point in the photographed image taken from two directions. Accordingly, the position of the golf ball along the first horizontal axis W can be specified from the coordinates of the center-of-mass of the golf ball in the photographed images taken from two directions. The position of the golf ball in three-dimensional space can thus be specified.

Figure 7:
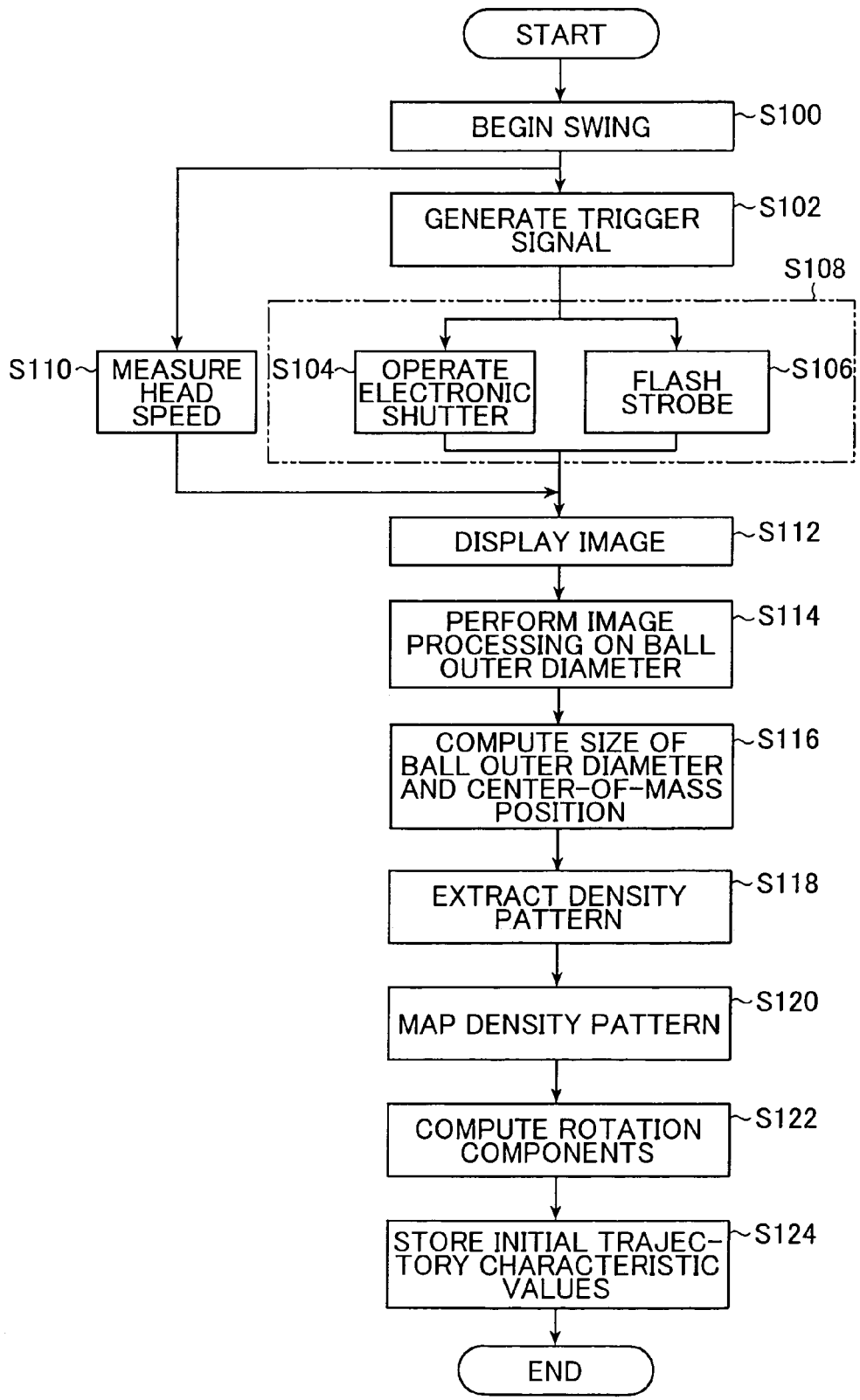
FIG. 7 is a flowchart that explains a method of measuring initial trajectory characteristic values of a golf ball of this embodiment.

FIG. 7 is a flowchart that explains a method of measuring initial trajectory characteristic values of a golf ball of this embodiment. Further, FIGS. 8A to 8C are timing charts that explain examples of timing signals that control the operation of a CCD camera of the initial trajectory measuring apparatus of this embodiment.

Referring to FIG. 7, first the golfer 4 or a swing robot (not shown) begins to swing the golf club 6 (step S100).

Figure 8A:
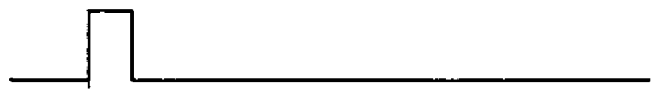
FIGS. 8A to 8C are timing charts that explain examples of timing signals that control the operation of a CCD camera of the initial trajectory measuring apparatus of this embodiment.

Next, when a golf club head of the golf club 6 passes through a detection position of a golf club head detecting device (not shown) disposed in a region immediately before impact, the golf club head detecting device generates a trigger signal like that shown in FIG. 8A (step S102). The golf club head detecting device then sends the trigger signal to the controller device 22.

Figure 8B:
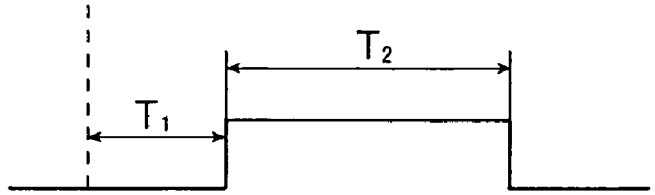
Figure 8C:
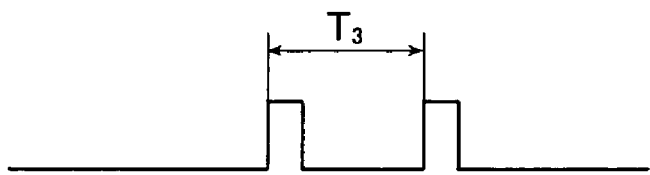

The controller device 22 generates a camera operation signal as shown in FIG. 8B so that the electronic shutter of the CCD camera 16 will open $T_1$ seconds after the trigger signal rises, and then the controller device 22 sends the camera operation signal to the CCD camera 16. The electronic shutter opens for $T_2$ seconds after receiving the camera operation signal (step S104).

At the same time, the controller device 22 sends a strobe illumination signal like that shown in FIG. 8C to a strobe (not shown). The strobe flashes two times, with an interval of time of $T_3$ seconds therebetween, during the $T_2$ second period of time during which the electronic shutter is open (step S106), thus illuminating the golf ball 8. The initial trajectories of the golf ball 8 immediately after being struck are thus recorded across the $T_3$ second period of time by using the two strobe illumination lights (step S108). The one planar image 30 is thus obtained, on which the golf ball images before and after the $T_3$ second period of time has elapsed are photographed.

It should be noted that a high speed camera that photographs golf ball images by opening a shutter two or more times in order to obtain one planar image, thus photographing with multiple exposures, may also be used as described hereinafter.

At the same time, a head speed measuring apparatus (not shown) measures the head speed of the golf club head 6 (step S110). The head speed measuring apparatus may also be a separate apparatus not included with the initial trajectory measuring apparatus for the golf ball 8 of this embodiment. Further, the head speed measuring apparatus may be one in which two sensors are disposed with a predetermined spacing therebetween in the golf club head detecting apparatus described above. The head speed of the golf club may then be measured by using a time interval between detection of the golf club head by the two sensors.

The planar image 30 (refer to FIG. 3) on which the initial trajectories of the golf ball 8 obtained in step S108 are recorded is displayed in the display device 48 along with data such as the head speed of the golf club head obtained in step S110 (step S112).

The planar image 30 (refer to FIG. 3) is read in by the image reading portion 40 as digital data at this point. After unnecessary image portions such as the peripheral environment are eliminated, the outer shape of the images 32, 34, 36, and 38 of the golf ball 8 undergo image processing, and outline regions for the golf ball at each time point are detected (step S114).

Next, the size (diameter) and center-of-mass of each of the golf ball outline regions are computed, and coordinates of the center-of-mass of each of the golf ball outline regions are computed (step S116).

The three-dimensional movement direction and the movement amount are then computed based on the coordinates of the center-of-mass of the outline portions, and the amount of the time interval. In this embodiment the relationship between the coordinates of the center-of-mass position of the golf ball and the position on the first horizontal axis W is found in advance by performing calibration. Accordingly, the movement amount in the first horizontal axis W direction can also be computed based on the coordinates of the center-of-mass of the outline regions in the photographed image.

Next, the launch angle and the initial velocity of the golf ball are computed from the three-dimensional movement amount thus obtained. The computation results are then output to the memory portion 45.

Density patterns for each of the golf ball outline regions are extracted next (step S118).

The density pattern extraction performed in step S118 converts the outline region of the golf ball (golf ball image) initially recorded into density data having two gray scales, for example. Next, a specific density pattern in the concentration distribution obtained is set as the first image information.

Further, the outline region of the golf ball (golf ball image) recorded after a predetermined period of time has elapsed is converted into density data under computation conditions that are the same as those used to convert the golf ball outline region initially recorded into a density pattern.

It should be noted that there are no particular limitations placed on the size or the number of regions used to compute the density pattern (the first image information). It is preferable that the number of regions used to compute the density pattern be a plurality in order to increase the measurement precision. It should also be noted that the density pattern may also be set by a tester using the apparatus. The specific pattern thus determined is stored in the setting portion 49.

Next, the density pattern 35a extracted from the golf ball image 34 is mapped onto the surface of the first virtual sphere Q, and the density pattern 33a extracted from the golf ball image 32 is mapped onto the surface of the second virtual sphere q (step S120).

Rotation processing is then performed on the first virtual sphere Q. The first virtual sphere Q is rotated three-dimensionally, and compared to the second virtual sphere q. A determination is made at this point as to where the correlation coefficient between the first virtual sphere Q and the second virtual sphere q is highest, or whether the correlation coefficient is equal to or greater than a predetermined correlation coefficient. Rotation processing is repeatedly performed on the first virtual sphere Q until the correlation coefficient reaches its highest value, or becomes equal to or greater than the predetermined correlation coefficient. That is, the first virtual sphere Q is repeatedly rotated in three dimensions. The position of the density pattern 35a of the first virtual sphere Q is thus specified in the second virtual sphere q.

In this embodiment the golf ball is a sphere and undergoes rotational motion in this embodiment. Accordingly, the shape of the density pattern (image information) may not necessarily be maintained. In such cases, the values used in rotation processing when determining whether the correlation coefficient between the first virtual sphere Q, which has undergone rotation processing, and the second virtual sphere q has reached it highest value, or is equal to or greater than the predetermined value, may also be set as a three-dimensional rotation amount.

It should be noted that, considering that a predetermined region expressed by a density pattern is on the spherical surface, for example, the predetermined region expressed by the density pattern may also be used to create a simulated image that changes shape due to rotational movement in this embodiment. The correlation coefficient may then be found by using the simulated image.

Next, the rotation axis in three-dimensional space, and the rotation amount about the rotation axis (rotation angle), are computed based on the three-dimensional rotation amount found in step S120 (step S122).

The rotation axis in three-dimensional space, and the amount of rotation about the three-dimensional axes (rotation angles) are decomposed into rotation components in the parallel direction and the meridian direction of the golf ball. In other words, the rotation axis and the rotation amount in three-dimensional space are projected in the vertical axis V direction and in the first horizontal axis W direction shown in FIG. 4. The computing portion 44 computes initial trajectory characteristic values such as the backspin rate and the side spin rate using the time interval.

The initial trajectory characteristic values for the golf ball 8 are stored in the memory portion 45 when the measurements are complete (step S124), thus completing measurements made by the initial trajectory measuring apparatus 2 for the golf ball 8.

Figure 9A:
FIGS. 9A to 9C are explanatory diagrams that explain other examples of timing signals that control the operation of a CCD camera of the initial trajectory measuring apparatus of this embodiment.
Figure 9B:
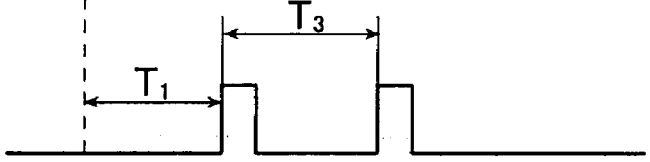
Figure 9C:

With the measurement method described above, the images of the golf ball are photographed when two strobe lights flash with a $T_3$ second time interval therebetween while the shutter of the CCD camera 16 is open. However, a high speed camera may also be used as shown in FIGS. 9A to 9C. A shutter may be opened after $T_1$ seconds have elapsed after a trigger signal (see FIG. 9A) rises, and a camera operation signal (see FIG. 9B) may then be generated to re-open the shutter after $T_3$ seconds have elapsed. The golf ball images may thus be photographed with double exposures. When an amount of light sufficient to perform photography cannot be ensured, a strobe illumination signal may be generated to cause the strobe to emit light over a long period of time, at least during the period when the shutter opens two times, as shown in FIG. 9C. Alternatively, a strobe illumination signal may be generated to cause the strobe to flash two times in synchronous with the two shutter openings. On the other hand, illumination light of a strobe etc. is unnecessary when an amount of light, such as natural light, sufficient for photography can be ensured. In particular, a sufficient amount of light can be obtained when photographing with double exposures outdoors. Accordingly, illumination light of a strobe etc. becomes unnecessary, and photography can be easily performed.

With the method of measuring the initial trajectories of this embodiment, the two recorded golf ball images are each converted to density data, and a density pattern of the golf ball initially recorded is found. A region of the outline region of the golf ball next recorded whose density pattern coincides with the density pattern of the golf ball initially recorded is specified by using an image correlation method, for example. The rotation axis of the golf ball in three-dimensional space, and the rotation amount about the rotation axis, are thus found. The backspin rate and the side spin rate, for example, can then be found based on the recording interval. Further, the method of computing the initial trajectories of this embodiment can also compute the launch angle and the movement velocity by computing the size of the outline region and the center-of-mass position of the golf ball.

Further, the position of the golf ball after the predetermined period of time has elapsed is found by using an image correlation method. Accordingly, the position of the golf ball can be specified even when there is a large side spin rate, a portion of the region that computes the density pattern is hidden, and the overall region cannot be detected. The method of measuring the initial trajectories of this embodiment is thus suited to automated measuring.

In addition, it is known that the measurement precision of the initial trajectories decreases dramatically with a conventional method of detecting and tracking a mark in the case where a portion of the mark is not recorded. However, an image correlation method is used in the method of measuring the initial trajectories of this embodiment, as described above, and therefore there is no decrease in measurement precision.

In addition, measurements can be made without providing specific marks, and it thus becomes easier to make measurements. For example, a mark is provided on a golf ball in order to determine whether or not the golf ball is authorized. The initial trajectory measurement method of this embodiment can make measurement by utilizing the mark.

Further, it is presupposed in this embodiment that the body being measured is a sphere, and the density pattern is specified by using an image correlation method. Accordingly, an estimate of coincidence with the density pattern of the image taken after the predetermined period of time has elapsed is also easy to make.

It should be noted that the region in the golf ball image used in computing the density pattern is not limited to one region. A plurality of regions may also be used. Density patterns may be computed, and corresponding regions which have the correlation coefficient equal to or greater than a predetermined value may be specified from the golf ball image next recorded. The rotation axis of the golf ball in three-dimensional space and the rotation amount may thus be found. In addition, the backspin rate and the side spin rate may also be computed, for example. The measurement precision can thus be further increased.

In addition, in the case where, for example, there is dispersion in the impact direction among each impact made by the golfer, and the actual flying direction of the struck ball does not always correspond to a set target direction for the flying body (flying body direction), the flying body direction may also be set in this embodiment based on a line formed by projecting the movement direction between the first time point image (the golf ball image 34) and the second time point image (the golf ball image 32) onto a horizontal plane.

In this case the launch angle is expressed by an angle formed between the movement direction between the first time point image (the golf ball image 34) and the second time point image (the golf ball image 32) and the horizontal plane HS. The three axes that determine the rotation axis and the rotation amount of the golf ball in three-dimensional space can be set to the first horizontal axis W and the vertical axis V shown in FIG. 4, and a line H (not shown) that is parallel to the direction toward which the golf ball is struck.

A second embodiment of a measuring apparatus of the present invention is explained next.

Figure 10:
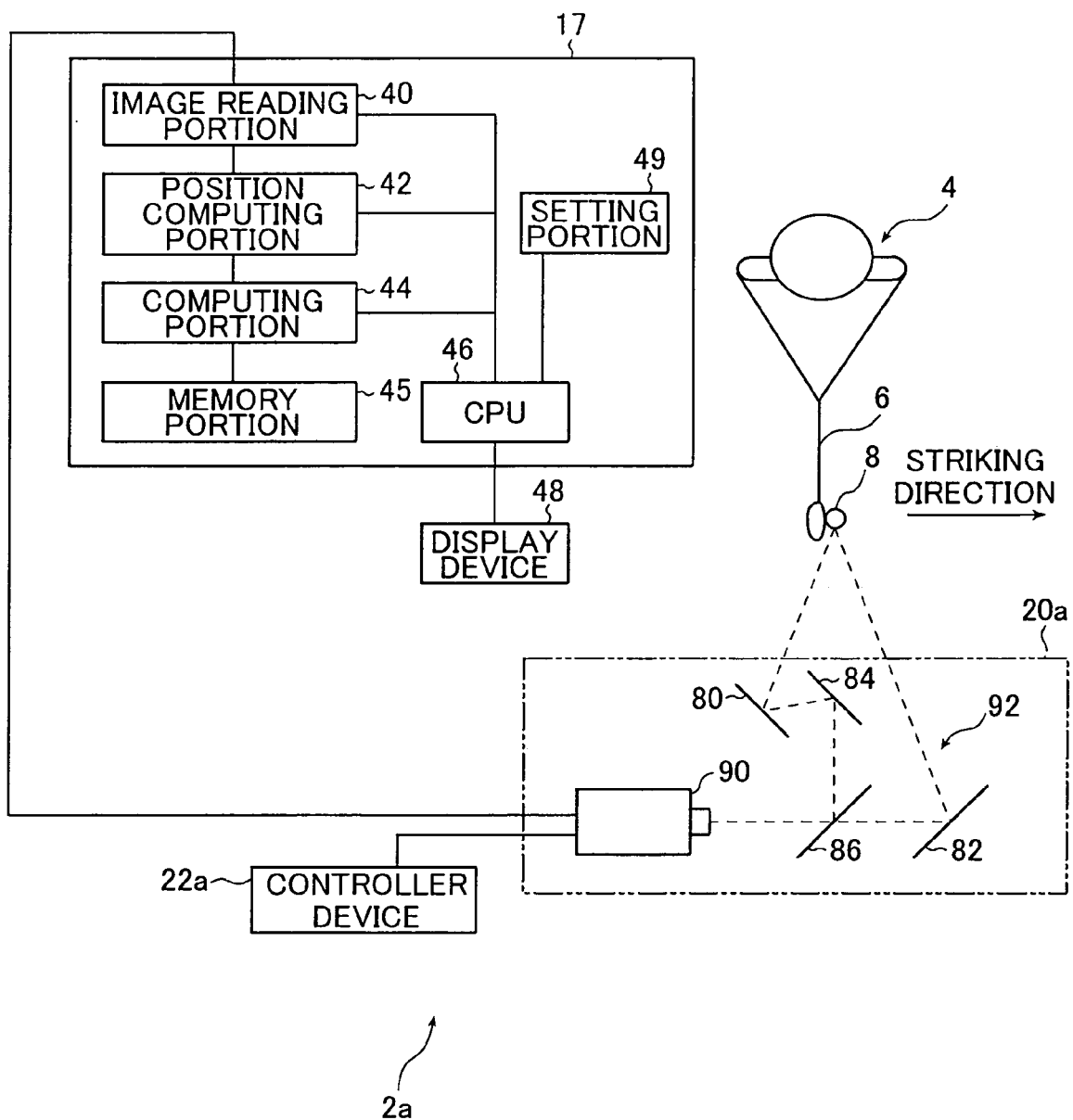
FIG. 10 is a schematic side view that shows an initial trajectory measuring apparatus, which is an example of a measuring apparatus according to a second embodiment of the present invention.

FIG. 10 is a planar view that schematically shows the second embodiment of the present invention. It should be noted that symbols identical to those used in the first embodiment are provided to constituent elements that are similar to those of the initial trajectory measuring apparatus 2 of the first embodiment shown in FIG. 1. Detailed explanations of such constituent elements are omitted.

An initial trajectory measuring apparatus 2a for a golf ball of this embodiment shown in FIG. 10 has a different mirror arrangement compared to that of the initial trajectory measuring apparatus 2 shown in FIG. 1. The other configurations are similar to those of the initial trajectory measuring apparatus of the first embodiment, and detailed explanations thereof are omitted here.

Referring to FIG. 10, The initial trajectory measuring apparatus 2a has mirrors 80 and 82, an adjustment mirror 84, a half mirror 86, a CCD camera 90, a controller device 22a connected to the CCD camera 90, and an initial trajectory parameter computation portion 17.

The mirrors 80 and 82, the adjustment mirror 84, the half mirror 86, and the CCD camera 90 configure a main body portion 92. It is possible to make the main body portion 92 portable by housing it in a case 20a. The controller device 22a is connected to the CCD camera 90. The controller device 22a is also connected to the initial trajectory parameter computing portion 17 so that images output from the CCD camera 90 are supplied to the initial trajectory parameter computing portion 17. Further, the initial trajectory parameter computing portion 17 is connected to the display device 48.

The main body portion 92 housed in the case 20a may be disposed in a position opposite the golfer 4 who is test-hitting the golf ball 8, while sandwiching the golf ball 8.

The mirrors 80 and 86 are mirrors that reflect images of the golf ball 8 as seen from two different directions. The mirrors 80 and 86 are disposed in different positions in the direction toward which the golf ball 8 is struck (right direction in FIG. 10).

The golf ball 8 is struck toward the striking direction when test-hit by the golfer 4. The image of the golf ball 8 immediately after being struck is reflected by the mirror 82 and projected onto the half mirror 86. The projected image of the golf ball 8 passes through the half mirror 86 toward the CCD camera 90.

Further, the image of the golf ball 8 immediately after being struck is reflected by the mirror 80 and then reflected by the adjustment mirror 84. The image of the golf ball 8 that has been reflected by the adjustment mirror 84 is then further reflected by the half mirror 86 toward the CCD camera 90.

The disposition of the mirrors 80 and 82 are, or the disposition of the adjustment mirror 84 is, adjusted so that the two images of the golf ball 8 seen from different directions overlap as little as possible when photographed by the CCD camera 90.

The mirrors 80 and 82 are disposed in fore and aft positions in the striking direction in this embodiment, different from the first embodiment. However, the arrangement of the mirrors 80 and 82 in this embodiment is not limited to the fore and aft positions in the impact direction. The mirrors 80 and 82 may also be disposed in different positions in a vertical direction, similar to the first embodiment.

Further, the configuration in this embodiment includes the adjustment mirror 84 unlike the first embodiment. Reasons for including the adjustment mirror 84 are described hereinafter.

This embodiment uses the adjustment mirror 84 as described above.

The adjustment mirror 84 reflects projected images along with the mirror 80 and the half mirror 86. Accordingly, the image of the golf ball 8 photographed by the CCD camera 90 is a mirror image. On the other hand, the image of the golf ball 8 that is reflected by the mirror 82 and then passes through the half mirror 86 before reaching the CCD camera 90 is also a mirror image. The adjustment mirror 84 is thus a mirror used for adjustment in order to make the image of the golf ball 8 arriving at the CCD camera 90 after being reflected by the mirror 80 into a mirror image. The image of the golf ball 8 that arrives at the CCD camera 90 after being reflected by the mirror 82 also becomes a mirror image.

Accordingly, four golf ball images are obtained in this embodiment when the image of the golf ball 8 immediately after being struck is actually photographed by the CCD camera 90 using strobe illumination. In other words, the four golf ball images are obtained when the images of the struck golf ball 8 are photographed at two points in time with a predetermined period of time therebetween.

In this case the photographed images of the golf ball 8 are all mirror images due to using the adjustment mirror 84, and the four images of the golf ball 8 move in the same direction. It therefore becomes extremely unlikely that the golf ball images will overlap, even when the images of the golf ball 8 photographed from each direction are moved closer together.

It should be noted that, the present invention is not limited to cases where the photographed images of the golf ball are mirror images as in this embodiment. The photographed images may also be normal images. In addition, the adjustment mirror is not limited to being disposed in a location where light reflected by the mirror 80 intersects with light reflected by the half mirror 86 as in this embodiment. The adjustment mirror may also be disposed between the mirror 82 and the half mirror 86.

Further, although one adjustment mirror is used in this embodiment, any odd number of adjustment mirrors may also be used. It is preferable that, at minimum, the adjustment mirror or mirrors be disposed so that the image of the golf ball 8 that arrives at the CCD camera 90 after being reflected by the mirror 80 and the image of the golf ball 8 that arrives at the CCD camera 90 after being reflected by the mirror 82 are both mirror images or both normal images.

It should be noted that, although a stereo projection method from two directions is used in computing the position of the golf ball on the first horizontal axis W in the first embodiment and the second embodiment, the present invention is not limited to using a stereo projection method. For example, images photographed from one direction may be used. The size of the flying body golf ball in three-dimensional space may then be specified by the size of the recorded outline region of the golf ball.

In this case, the calibration plate L shown in FIG. 6B may be photographed by moving the calibration plate L in a direction parallel to the first horizontal axis W by a distance t that is the same as the pitch p. The calibration plate L is moved by the distance t and photographed at this point, and therefore the predetermined size circles B are photographed on an equal interval spatial lattice. The sizes of the photographed images of the circles B located at crossing points on the spatial lattice are stored in the setting portion 49. Accordingly, a relationship becomes apparent between the position of each point on the spatial lattice and the size of the photographed image of the corresponding circle B. The position of an object to be measured on the first horizontal axis W can therefore be specified from a photographed image provided that the size of the measured object is set in the setting portion 49. The position of the golf ball (object to be measured) can thus be specified in three-dimensional space.

The position of the golf ball in three-dimensional space can thus be specified in three-dimensional space in the first embodiment as well as the second embodiment by the size of the outlines of the golf ball.

A measuring method for specifying the position of the golf ball in three-dimensional space based on the size of the golf ball outlines is explained next.

In this case the diameters of the outline regions of the images 32, 34, 36, and 38 of the golf ball 8 are computed by the position computing portion 42 and then output to the computing portion 44. The position of the golf ball 8 on the first horizontal axis W is then specified by the computing portion 44 based on the diameters of the outline regions. The three-dimensional movement of the golf ball 8 can thus be computed. Other measuring methods are similar to those of the first embodiment, and detailed explanations thereof are thus omitted here.

Further, although images seen from two directions are recorded in the first embodiment and the second embodiment described above, the present invention is not limited to using two directions.

Figure 11A:
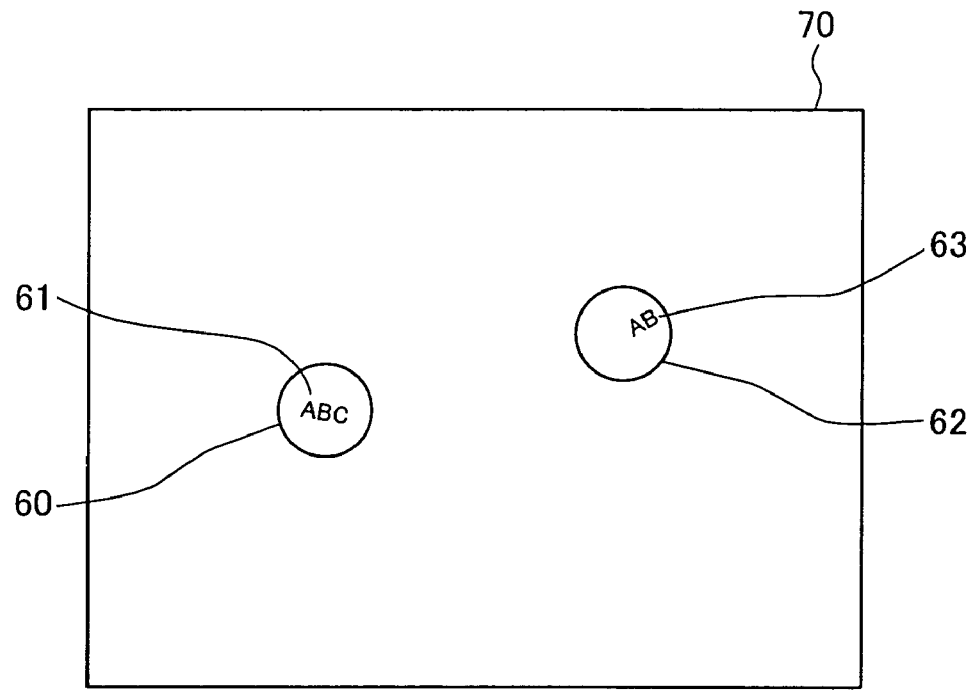
FIGS. 11A and 11B are schematic diagrams that show a process order of a method of measurement employed by an initial trajectory measuring apparatus, which is an example of the measuring apparatus according to a third embodiment of the present invention.

Referring to FIG. 11A, a golf ball 60 on which a logo 61 is printed, for example, can also be applied to recording from one direction as expressed in a planar image 70.

Figure 11B:
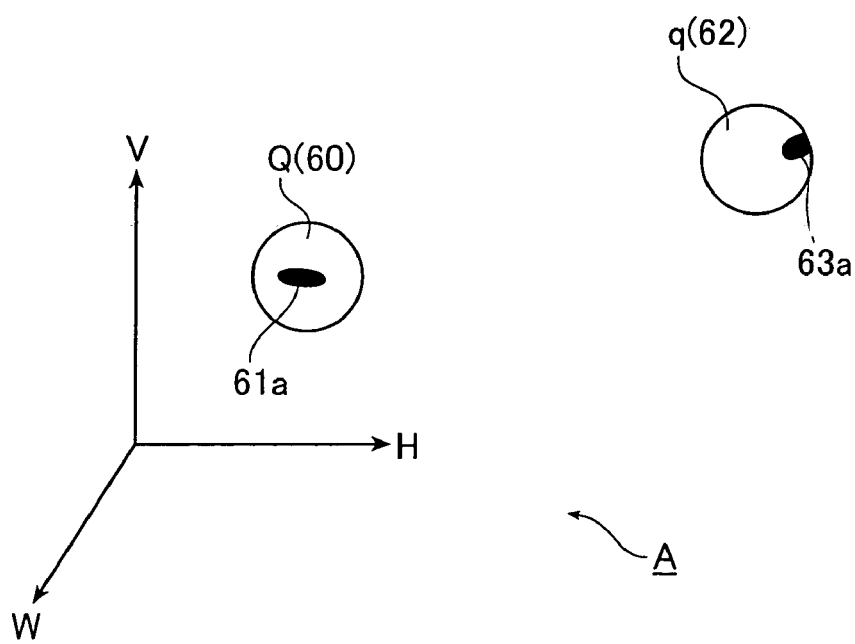

FIGS. 11A and 11B are schematic diagrams that show a process order of a method of measurement employed by an initial trajectory measuring apparatus, which is an example of a measuring apparatus according to a third embodiment of the present invention.

In FIG. 11A the golf ball image 60 is recorded initially, and a golf ball image 62 is recorded after a predetermined period of time has elapsed. In this case a portion of the logo 61 is hidden after the predetermined period of time has elapsed, resulting in a logo 63. Automated measurements cannot be performed by a conventional method when a portion of the logo 63 is thus hidden.

The golf ball image 60 undergoes binarization processing, for example, in this embodiment. A density pattern of the logo 61 portion is thus obtained. The density pattern is expressed by a mark 61a mapped onto the surface of the first virtual sphere Q shown in FIG. 11B. The mark 61a is set as a specific point (density pattern). The golf ball image obtained after the predetermined period of time has elapsed also undergoes binarization processing under the same conditions as those used to obtain the mark 61a. In this case a mark 63a mapped onto the surface of the second virtual sphere q is obtained as shown in FIG. 11B.

Rotation processing is performed on the first virtual sphere Q also in this embodiment, and the correlation between the first virtual sphere Q, on which image processing has been performed, and the second virtual sphere q is found by using an image correlation method. The position of the mark 61a on the second virtual sphere q is thus specified. The rotation axis of the golf ball in three-dimensional space, and the amount of rotation about the rotation axis, can thus be found.

The backspin rate and the side spin rate, for example, can then be computed based on the rotation axis, and the amount of rotation about the rotation axis, of the golf ball in three-dimensional space. The three-dimensional launch angle and the initial velocity can of course also be computed for the golf ball.

Figure 12:
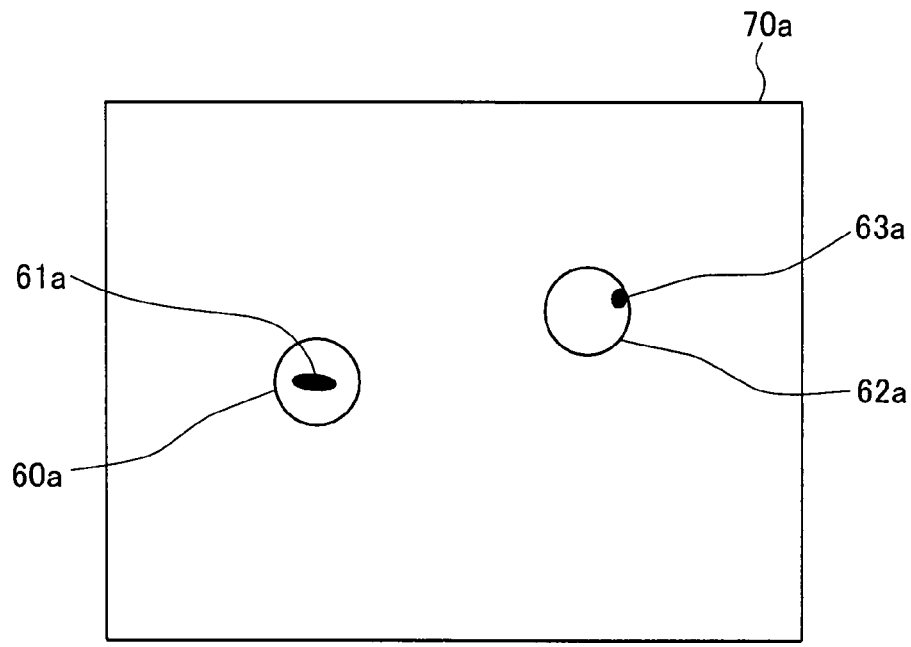
FIG. 12 is a schematic view that shows outline images of the third embodiment.
Figure 13:
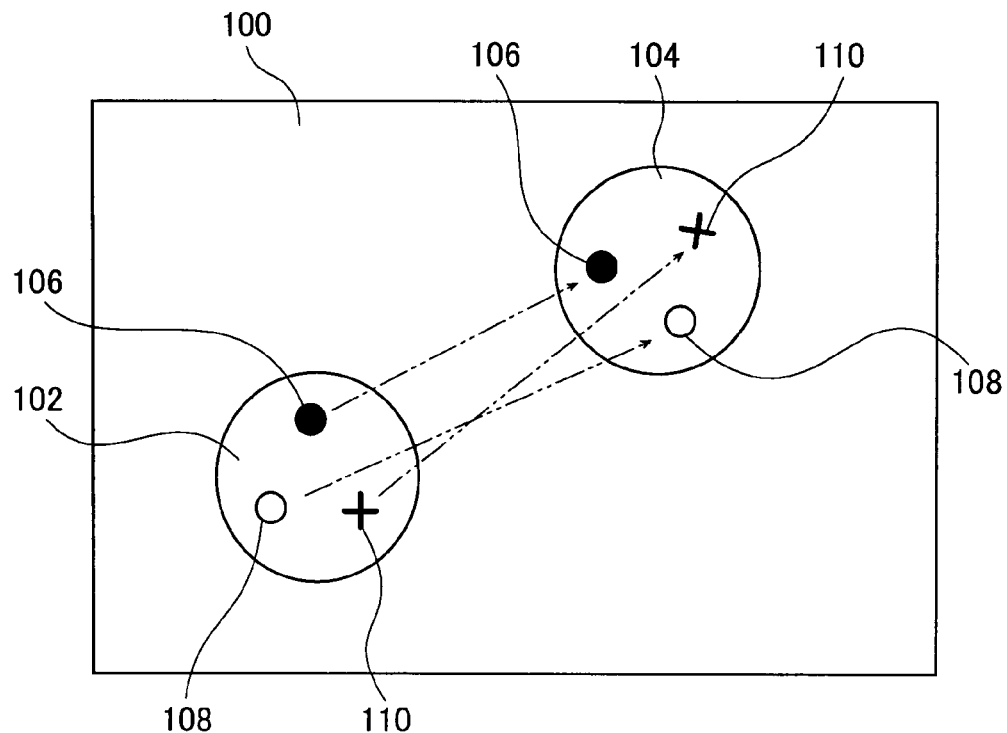
FIG. 13 is a schematic view that explains a method of analyzing the movement of a golf ball in JP 2003-57258 A.
Figure 14:
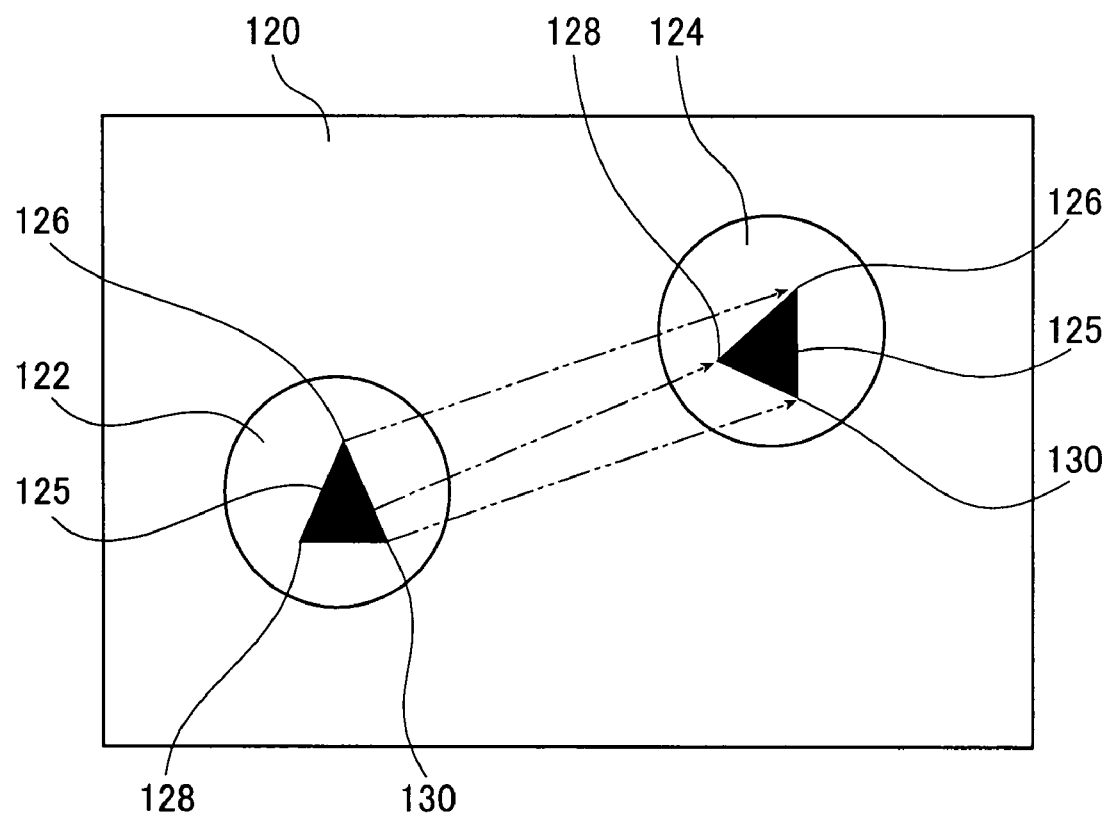
FIG. 14 is a schematic view that explains a method of analyzing the movement of a golf ball in JP 2000-19186 A.

It should be noted that a planar image 70a having an outline image 60a, with which the mark 61a is formed, and an outline image 62a, with which the mark 63a is formed, may also be displayed in the display device 48 as shown in FIG. 12 to allow a user to view the images.

Further, the golf ball is photographed from one direction in this embodiment. Accordingly, the position of the golf ball in three-dimensional space is specified based on the size of the recorded outline region of the golf ball. In this case a relationship between the position of each crossing point on the spatial lattice and the size of the photographed image of the corresponding circle B is found as shown In FIG. 6A. The position of the golf ball in three-dimensional space can thus be specified from the size of the outline region of the golf ball.

It should be noted that, in each of the embodiments described above, density patterns are extracted from the image of the golf ball initially recorded and from the image of the golf ball recorded after a predetermined period of time has elapsed. The density patterns are then individually mapped onto the surface of respective virtual spheres. The rotation amount of the golf ball is computed by specifying the position of the density pattern using an image correlation method on each of the virtual spheres. An image correlation method in which a known particle image velocimetry (PIV) method is employed can be used to match the specified points (density patterns).

Further, an example of computing the backspin and the side spin of the golf gall is explained in each of the embodiments described above. The results can of course also be utilized in a trajectory simulation of the golf ball (flying body) in three-dimensional space.

Further, although the number of gray scales is two for the density data in each of the embodiments described above, the present invention is not limited to using two gray scales. Density data having any number of gray scales can also be used for image characteristic quantities in the present invention.

The present invention is basically described above.

A measuring apparatus and a method of measuring the flying behavior of a flying body according to the present invention are explained in detail above. The present invention is not limited to the embodiments describe above, however. It is of course possible to make a variety of improvements and changes in a scope that does not deviate from the gist of the present invention.

It is possible to apply the measuring apparatus and the method of measuring the flying behavior of a flying body according to the present invention to spherical flying bodies other than golf balls. For example, the initial velocity, the movement direction, the rotational angular velocity (spin rate), and the rotation direction of a baseball, a tennis ball, or the like can also be similarly measured.

Further, there are no limitations placed on finding the side spin about the vertical axis V (refer to FIG. 4) and the backspin about the first horizontal axis W (refer to FIG. 4) by using the rotation axis, and the amount of rotation about the rotation axis, of a flying body in three-dimensional space. The rotation amount of a flying body about the second rotation axis H shown in FIG. 4 (number of rotations per unit time) can also be computed in the present invention.

What is claimed is:

1. A measuring apparatus that measures a flying behavior of a spherical flying body, comprising:
   a recording portion that optically records a spherical flying body during flight at points in time with a predetermined interval of time, to obtain a first image and a second image of the spherical flying body;
   an image information computing portion that detects a first outline region of the flying body in the first image of the flying body and a second outline region of the flying body in the second image of the flying body, and finds first image information from the first image of the flying body in at least a portion of the first outline region and second image information from the second image of the flying body in the second outline region; and
   a rotation amount computing portion that maps the first image information to a surface of a first virtual spherical body, maps the second image information to a surface of a second virtual spherical body, and computes a rotation amount that is used for rotation processing such that the rotation processing is performed on the first virtual spherical body to obtain a highest correlation between the first image information on the surface of the first virtual spherical body and the second image information on the surface of the second virtual spherical body.

2. The measuring apparatus according to claim 1, further comprising a rotation velocity computing portion for computing a rotational velocity of the flying body based on the predetermined interval of time and the rotation amount of the flying body.

3. The measuring apparatus according to claim 2, wherein said rotational velocity computing portion further decomposes the rotation amount of the flying body into components in three axial directions, and computes the rotational velocity in each of the axial directions.

4. The measuring apparatus according to claim 3, wherein:
the flying body flies with an angle of inclination with respect to a horizontal plane;
a first axis direction from among the three axial directions is defined as a first direction that is parallel to the horizontal plane; and
a second axis direction from among the three axial directions is defined as a second direction that is perpendicular to the horizontal plane.

5. The measuring apparatus according to claim 4, wherein:
the flying body is a golf ball;
the rotation amount per unit time about the first axis direction is defined as backspin rate; and
the rotation amount per unit time about the second axis direction is defined as side spin rate.

6. The measuring apparatus according to claim 1, wherein:
the first image information and the second image information are expressed by a pattern having at least two gray scale levels; and
the first image information and the second image information have the same number of gray scales.

7. The measuring apparatus according to claim 1, wherein:
the first image information and the second image information are a first density data and a second density data respectively; and
the rotation amount computing portion maps values of the first density data to the surface of the first virtual spherical body, maps values of the second density data to the surface of the second virtual spherical body, and computes the rotation amount such that the rotation processing is performed on the first virtual spherical body to obtain a highest correlation coefficient between values of the first density data and values of the second density data.

8. A method of measuring a flying behavior of a flying body, comprising:
optically recording a spherical flying body during flight at points in time with a predetermined interval of time, to obtain a first image and a second image of the spherical flying body;
detecting a first outline region of the flying body in the first image of the flying body;
finding first image information from the first image of the flying body in at least a portion of the first outline region;
detecting a second outline region of the flying body in the second image of the flying body;
finding second image information from the second image of the flying body in the second outline region;
mapping the first image information to a surface of a first three-dimensional virtual spherical body;
mapping the second image information to a surface of a second three-dimensional spherical body;
performing rotation processing on the first virtual spherical body; and
computing a rotation amount that is used for the rotation processing such that a highest correlation is obtained between the first image information on the surface of the first virtual spherical body and the second image information on the surface of the second virtual spherical body.

9. The method of measuring the flying behavior of a flying body according to claim 8, further comprising computing a rotational velocity of the flying body based on the predetermined interval of time and the rotation amount.

10. The method of measuring the flying behavior of a flying body according to claim 9, wherein said computing of the rotation amount of the flying body includes decomposing the rotation amount of the flying body into components in three axial directions and computing the rotational velocity in each of the axial directions.

11. The method of measuring the flying behavior of a flying body according to claim 10, wherein:
the flying body is a golf ball;
the golf ball flies with an angle of inclination with respect to a horizontal plane;
the rotation amount per unit time about a first axis direction parallel to the horizontal plane from among the three axial directions is defined as backspin rate; and
the rotation amount per unit time about a second axis direction perpendicular to the horizontal plane from among the three axial directions is defined as side spin rate.

12. The method of measuring the flying behavior of a flying body according to claim 8, wherein:
the first image information and the second image information are expressed by a pattern having at least two gray scale levels; and
the first image information and the second image information have the same number of gray scales.

13. The method of measuring a flying behavior of a flying body according to claim 8, wherein:
the first image information and the second image information are a first density data and a second density data respectively; and
values of the first density data to the surface of the first virtual spherical body are mapped,
values of the second density data to the surface of the second virtual spherical body are mapped,
and
the rotation amount is calculated such that the rotation processing is performed on the first virtual spherical body to obtain a highest correlation coefficient between values of the first density data and values of the second density data.

* * * * *